UNITED STATES PATENT OFFICE.

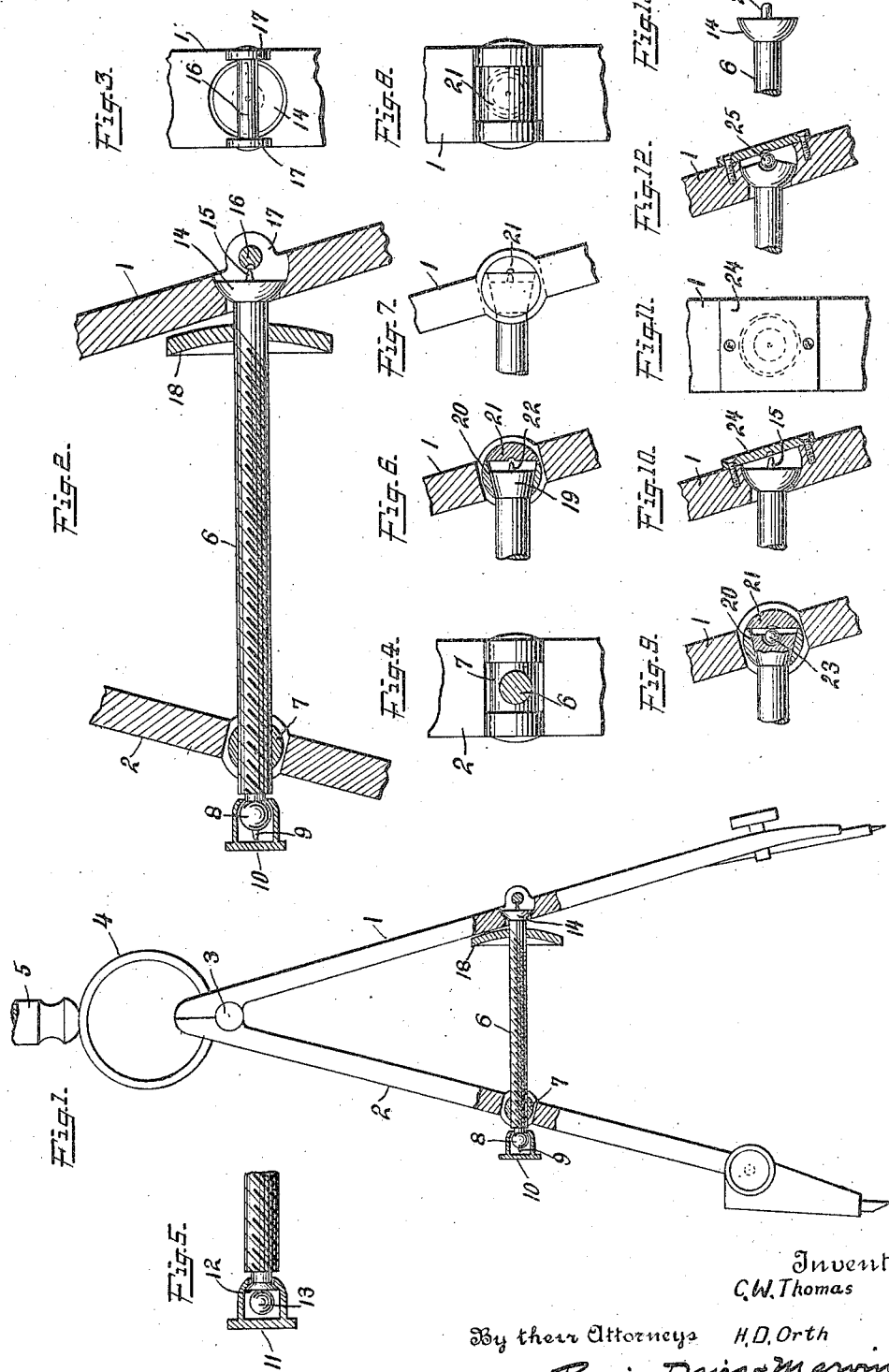

CHARLES W. THOMAS AND HERBERT D. ORTH, OF MADISON, WISCONSIN.

ADJUSTING MECHANISM FOR GEOMETRICAL INSTRUMENTS AND THE LIKE.

1,234,234.

Specification of Letters Patent.  Patented July 24, 1917.

Application filed August 9, 1916. Serial No. 113,851.

*To all whom it may concern:*

Be it known that we, CHARLES W. THOMAS and HERBERT D. ORTH, both citizens of the United States, residing in Madison, county of Dane, and State of Wisconsin, have invented certain new and useful Improvements in Adjusting Mechanism for Geometrical Instruments and the like; and we do hereby declare the following to be a full, clear, and exact description of the invention, such as will enable others skilled in the art to which it appertains to make and use the same.

The adjusting mechanism of the present invention is useful in connection with tools, geometrical instruments, and the like, where two members are to be quickly adjusted toward or from one another, and particularly where the adjusted members may need a supplemental and more accurate final adjustment. This is the case in geometrical instruments, such as calipers, compasses, bow pencils, and the like, for with these instruments it is often desirable to quickly change the span of the leg members and then, by more accurate adjustment, to bring them slowly to an exact predetermined distance apart.

It is an object of the present invention to provide an adjusting mechanism comprising a rotatable member having frictional engagement with one of the members to be adjusted and threaded engagement with the other, this rotatable member being axially movable to rotate more freely when a quick or large adjustment is to be made, and then to hold said members in the adjusted position while permitting the finer or more accurate adjustment to be made by slow manual rotation of the rotatable member.

Various other objects and advantages will be made clear by the following description, which is to be taken in connection with the accompanying drawings, wherein is illustrated one complete embodiment of the invention and various modifications of some of the details.

In the drawings:—

Figure 1 is an elevation partly in section of a bow pencil constructed in accordance with the present invention;

Fig. 2 is an enlarged sectional elevation of the rotatable member whereby the legs of the instrument are adjusted toward or from one another;

Fig. 3 is a detail of the auxiliary bearing at one end of the rotatable member;

Fig. 4 illustrates the swinging nut for the other end of the rotatable member;

Fig. 5 is a modified pivotal bearing for the thumb piece near the threaded nut;

Figs. 6, 7 and 8 show a modified form of bearing for the right hand end of the rotatable member of Fig. 2;

Fig. 9 illustrates a further modification;

Figs. 10 and 11 are respectively a sectional elevation and an end view of a still further modification of this part of the apparatus; and Figs. 12 and 13 show additional modifications.

In the construction illustrated in Fig. 1, the members to be adjusted toward or from one another are the legs 1 and 2 of the bow instrument. These are pivoted to one another in usual manner at 3, and they extend beyond this pivot for engagement with a spring 4 to which the handle 5 of the instrument is attached. Spring 4 presses inward on the upper extensions of these legs and so constantly tends to spread their lower or free ends. There is provided a rotatable member 6 having multiple screw threads of high pitch or equivalent slots or grooves, and this has threaded engagement at one end with a nut 7 seated in leg member 2 and free to swing therein about a transverse axis so that as legs 1 and 2 move toward or from one another, the nut may adjust itself to the changing angular relation of rotatable member 6. The adjacent end of the rotatable member is provided with a ball 8 terminating in a pivot point 9 and loosely enveloped by the socket of a thumb piece 10. Pressure on the thumb piece will cause it to seat on the pivot point 9 and release the frictional engagement between the socket and ball 8.

In the modification illustrated in Fig. 5, the thumb piece 11 has its socket swaged inward to engage a cone 12, which takes the place of ball 8 of Fig. 1, and within the socket of the thumb piece is a loose ball 13 which can be brought into action by pressure on the thumb piece and serves as a low resistance pivot in much the same way that needle point 9 of Fig. 1 may serve.

The other end of the rotatable member is adapted to frictionally engage leg member 1 while remaining free to swing with respect thereto, so far as is necessary when the leg members are adjusted toward or from one another. This frictional engagement may be effected by means of a spherical socket in leg 1, within which fits a spherical enlargement 14 forming a part of rotatable member 6. As shown in Fig. 2, this spherical enlargement 14 carries a needle point 15 co-axial with the threaded portion of the rotatable member. Just opposite this needle point is a transverse bar 16 mounted in ears 17 on leg member 1 (Fig. 3), and this transverse bar 16 has a small recess spaced somewhat from the end of needle point 15 but into which the needle point may be received when the rotatable member is shifted longitudinally and with respect to leg 1. Bar 16 and its coöperating pivot 15 therefore form an auxiliary bearing offering low resistance to rotation of the rotatable member, this auxiliary bearing being adapted to come into action when the rotatable member is unseated from its frictional engagement at the ball and socket connection with leg 1.

The rotatable member includes an adjusting disk 18 preferably dished, as shown, and mounted near leg 1. It is by this adjusting disk that the finer adjustments of the instrument may be made by slow manual rotation of the rotatable member 6 within its nut 7. By mounting the disk near leg 1, these adjustments can be made conveniently and with but small tendency to swing the pencil point of one leg about the needle point of the other while the adjustments are being made. The dished form of the disk gives adequate clearance for leg 1 and also serves to accommodate the opposing engagement of leg 2, wherein the swinging nut 7 is mounted.

The operation of the device is as follows:
To close the legs of the instrument, a slight pressure is brought to bear upon the free ends of members 1 and 2. This causes ball 14 to move a slight distance from its socket and brings needle point 15 into contact with cross-bar 16. A slight further pressure on the legs in the direction to close them will result in a turning or spinning of the rotatable member 6. This is due to the steep pitch of the threads on the rotatable member. The span having thus been adjusted to the approximate radius and enlargement 14 being re-seated by spring 4, all finer adjustments are made by manually turning disk 18.

When it is desired to spread the legs apart, a slight pressure on thumb piece 10 causes it to seat on needle point 9 and to move ball 14 out of frictional engagement with its socket in leg 1, at the same time seating needle point 15 on cross-bar 16, thereby reducing the frictional resistance to the turning of rotatable member 6. The spring 4 then acts through the legs and nut 7 to turn or spin the rotatable member and a greater span is the result. Releasing the pressure on thumb piece 10 causes ball 14 to be drawn again into its socket where it acts as a brake to further turning of the rotatable member. Fine adjustments may then be made by disk 18 as before.

In the modification illustrated in Figs. 6, 7 and 8, the enlarged end of the rotatable member, instead of being spherical, as at 14 (Fig. 2), is provided with a cone 19 which is received within a cone-shaped socket provided in a transverse member 20. Member 20 has a cylindrical exterior, as indicated in elevation (Fig. 7), and can be slid into position from the side of leg member 1, as indicated in Fig. 8. This member 20 is, however, in two parts, and includes an independently movable slab 21 which serves as a cover for the socket of cone 19 and has a transverse slot into which the pivot point 22 of the rotatable member may move when the rotatable member is shifted axially to unseat cone 19 from its socket. By having slab 21 movable independently of the other part of transverse member 20, the structure is easy to assemble, and once assembled is not likely to get out of adjustment. The operation of the cone and of the auxiliary bearing afforded by needle point 22 and slab 21 is essentially the same as ball 14, and the auxiliary bearing of Fig. 2.

In the modification illustrated in Fig. 9, a ball 23 seated within the end of the conical enlargement of the rotatable member takes the place of the needle point 22 of Fig. 6 in furnishing a pivot about which the rotatable member may turn with low frictional impedance.

In the modification illustrated in Figs. 10 and 11, a flat plate 24 fastened by suitable screws to leg member 1 serves in place of transverse bar 16 of Fig. 2 in receiving the needle point 15 of the rotatable member.

In Fig. 12 the loose ball 25 takes the place of needle point 15 (Fig. 10) in forming the low resistance pivot or auxiliary bearing for the rotatable member.

In Fig. 13 the needle point 15 of Fig. 2 is replaced by a larger and more blunt projection 26 which, while offering the necessary low impedance to rotation, is at the same time somewhat more rugged than the needle point and more resistant to abuse.

Although the embodiment of the present invention particularly illustrated in the drawings is a drafting instrument, we are aware that our invention is applicable to other types of geometrical instruments, and even to other classes of tools and the like, where there is desired a quick adjustment of two members with capacity for a final and more accurate adjustment by subsequent manual manipulation.

We have illustrated certain permissible variations in details of the embodiment herein described, and we contemplate such changes in details and in arrangement of the component elements as may be within the spirit of our invention as defined by the appended claims.

We claim:

1. In combination, a pair of members to be adjusted toward or from one another, a rotatable member having frictional engagement with one member of said pair and threaded engagement with the other, said rotatable member being axially movable to rotate more freely when said pair of members are to be adjusted.

2. In a geometrical instrument, the combination of a pair of members to be adjusted toward or from one another, a rotatable member having threaded engagement with one of said pair of members and having at its other end a ball and socket connection with the other of said pair of members, a pivotal bearing for said rotatable member and means for shifting said rotatable member longitudinally to bring said additional bearing into action when desired.

3. In combination, a pair of members to be adjusted toward or from one another, a rotatable member having frictional engagement with one member of said pair and threaded engagement with the other, and an additional bearing for said rotatable member with which it may be brought in contact when said pair of members are to be adjusted, substantially as described.

4. In combination, a pair of members to be adjusted toward or from one another, a rotatable member having frictional engagement with one member of said pair and threaded engagement with the other, an additional bearing for said rotatable member with which it may be brought in contact when said pair of members are to be adjusted toward or from one another and means for reducing the frictional engagement of said rotatable member by shifting it longitudinally to bring said additional bearing into action when said members are to be adjusted, substantially as described.

5. In a geometrical instrument, the combination of a pair of members to be adjusted toward or from one another, a spring connected to separate said members, a rotatable member having frictional engagement with one of said pair of members and threaded engagement with the other, an additional bearing for said rotatable member with which it may be brought in contact when said rotatable member is shifted longitudinally, and means for shifting said rotatable member to bring said additional bearing into action when said members are to be separated by said spring.

6. In a geometrical instrument, the combination of a pair of leg members pivoted together, one of said legs having a socket and a bearing, and the other having a threaded nut, a rotatable member having one end frictionally engaging one of said legs to impede free rotation of said member, said rotatable member having threads of high pitch engaging with said nut to control the span of the legs and means for lessening the frictional impedance on said rotatable member when said legs are to be adjusted by rotation of said member through said nut.

7. In a geometrical instrument, the combination of a pair of leg members pivoted together, a spring urging their free ends away from one another, one of said legs having a socket and a bearing, and the other having a threaded nut mounted to swing on a transverse axis, a rotatable member having an enlarged end bearing against said socket and frictionally impeding free rotation of said member, said rotatable member having threaded engagement with said nut and a pivot at each end about which said member may rotate after said member has been shifted longitudinally to unseat said enlarged end from its socket, substantially as described.

8. In a geometrical instrument, the combination of a pair of leg members pivoted together, a spring urging their free ends away from one another, one of said legs having a socket and a bearing and the other having a threaded nut, a rotatable member having a ball and socket connection with one of said legs and a pivot for seating on said bearing, said rotatable member having threads of high pitch engaging with said nut to control the span of the legs and a thumb piece having pivotal connection with one end of said rotatable member and by which it may be shifted axially to bring the other pivot into engagement with its bearing, thereby leaving said rotatable member relatively free to turn in its nut while said legs are being spread by said spring.

9. In a geometrical instrument, the combination of a pair of leg members pivoted together, a spring urging their free ends away from one another, one of said legs having a socket and a bearing and the other having a threaded nut mounted to swing on a transverse axis, a rotatable member having its enlarged end forming with said socket a ball and socket connection frictionally impeding free rotation of said member, said rotatable member having threads of high pitch engaging with said swinging nut to control the span of the legs, a pivot at each end of said rotatable member so disposed that when pressure is applied to one pivot, the ball will be unseated from its socket and the other pivot will come into operative engagement with its bearing, whereby said rotatable member is left relatively free to turn in its nut while said legs are being spread by said spring.

10. In a geometrical instrument, the combination of a pair of leg members pivoted together, a spring urging their free ends away from one another, one of said legs having a socket and a bearing, and the other having a threaded nut mounted to swing on a transverse axis, a rotatable member having its enlarged end forming with said socket a ball and socket connection frictionally impeding free rotation of said member, said rotatable member carrying a dished driving disk rigidly mounted thereon near said ball and socket, said rotatable member having threads of high pitch engaging with said swinging nut to control the span of the legs, a pivot at each end of said rotatable member and a thumb piece movable into contact with one pivot, and by which pressure may be applied to unseat the ball from its socket and effect engagement of the other pivot with said bearing, whereby said rotatable member is left relatively free to turn in its nut while said legs are being spread by said spring.

In testimony whereof we affix our signatures.

CHAS. W. THOMAS.
HERBERT D. ORTH.

Copies of this patent may be obtained for five cents each, by addressing the "Commissioner of Patents, Washington, D. C."